United States Patent Office 3,576,759
Patented Apr. 27, 1971

3,576,759
PROCESS FOR EN MASSE PRODUCTION OF SPHERULES BY DESICCATION
Thomas C. Powell, West Alexandria, and Jerrold L. Anderson, Dayton, Ohio, assignors to The National Cash Register Company, Dayton, Ohio
No Drawing. Filed Apr. 12, 1968, Ser. No. 721,044
Int. Cl. B01j 13/02; B44d 1/02; A61k 9/04
U.S. Cl. 252—316
6 Claims

ABSTRACT OF THE DISCLOSURE

A method is provided for manufacturing solid spherules, en masse, in a liquid spherule processing vehicle by a technique employing desiccation. The process includes the steps of providing, dispersed in the spherule processing vehicle, "preliminary capsules" containing, within capsule walls of polymeric material, a liquid solution or slurry of the solid material to be spherified and then removing the contained liquid to yield, substantially spherical capsules, i.e., spherules, of dry, solid material. Production of the preliminary capsules is accomplished by well-known encapsulating methods utilizing, for example, liquid-liquid phase separation. Removal of the contained liquid is accomplished, in one embodiment of the novel process, by introducing particles of a solid, insoluble, desiccating material into the dispersion of preliminary capsules in spherule processing vehicle. The contained liquid is, thereby, attracted through the preliminary capsule wall and, being transported by the spherule processing vehicle, is sorbed by the desiccating material. Spherules produced by this invention can be made to include, among many other things, fertilizers, insecticides, pesticides, flavors, fragrances, foods and pharmaceutical products.

BACKGROUND OF THE INVENTION

Field of the invention

This invention relates to a novel process for producing, en masse, in a liquid processing vehicle, spherules of solid material. It more specifically pertains to a novel process for producing such spherules wherein liquid is removed from the cores of existing, liquid-containing, "preliminary capsules" to yield substantially spherical capsules containing a solid material which was originally dissolved or dispersed in the liquid of the preliminary capsule cores. The spherules of this invention can be made to provide prolonged release of water-soluble, solid, contents when they are placed in an aqueous environment. The process of this invention provides solid-containing capsules in a substantially spherical shape—sphericity being aesthetically and functionally desirable and preferred in some uses for the materials eligible to be so spherified.

Description of the prior art

In an article titled "How To Manufacture and Polish Smallest Pan Goods Made—Nonpareil Seeds," Louis E. Cimicata writing in Confectioners Journal, pp. 41–43, 1951, teaches that minute (about 700 pellets per ounce), spherical, pellets of confectionery material named "nonpareil seeds" are manufactured by a plurality of repeated pan-coating operations which operations require from 2 to 2½ days for completion. Spherules manufactured by the process of the present invention are similar in physical appearance and, in some instances, in composition, to nonpareil seeds. The process for manufacturing spherules of this invention is, however, different in every respect from pan-coating processes and can be completed in only a few hours.

The spherules of this invention also bear a resemblance, in some respects, to the spherical pellet product of U.S. Pat. No. 2,738,303, issued Mar. 13, 1956 on the application of Rudolph H. Blythe. The patent to Blythe teaches a method for producing substantially spherical pellets useful for providing prolonged release of medicament material contained in the pellets. Pellets of the above patent are produced by pan-coating methods and comprise: (a) a solid inner core of a plurality of concentric layers of medicament and adhesive for the medicament and; (b) a wax-fat external coating over the inner core. It is taught, in the Blythe patent, that manufacture of the pellets may require more than 20 separate coating-process steps for completion. The spherule manufacturing process of the present invention requires only a few processing steps.

U.S. Pats. Nos. 3,331,783 and 3,331,785, issued July 18, 1967 on the applications of Braun et al. and Fitch et al., respectively, teach a process for manufacturing spherical pellets of a combination of materials comprising actinide oxides wherein droplets of an aqueous mixture of the materials to be pelletized are contacted with a bath of warmed, organic, solvent which solvent serves to extract water from the droplets. The droplets are contacted with the water-extracting bath and the so-extracted water is removed from the bath by distillation. A completely different process is taught in the invention of applicants. In one embodiment of applicants' invention, liquid-containing droplets are encapsulated to yield preliminary capsules having capsule walls of a film of hydrophobic polymeric material. Liquid contained in the preliminary capsules is removed by dispersing the capsules in an organic spherule-processing vehicle which serves as a liquid-transporting agent to transfer contained liquid to solid particles of a desiccating material also present in the vehicle. In a preferred embodiment of applicants' invention, water is transferred through the preliminary capsule walls and is sorbed by a desiccant material without rupturing the existing preliminary-capsule-wall-film of hydrophobic polymeric material.

SUMMARY OF THE INVENTION

It is often desired or required, for any of several reasons, to obtain certain solid materials in the form of minute, substantially spherical, solid particles or pellets, hereinbefore and hereinafter referred to as "spherules." For purposes of describing the present invention, spherules will be limited, regarding size, to entities having diameters from about 50 microns to about 2000 microns, or perhaps slightly larger.

In the pharmaceutical industry, spherules comprising medicament combined with fillers, adhesives, lubricants or other excipients are useful and desirable both for aesthetic reasons and because the spherules can be utilized to provide effective medicament dosage forms. Spherules also exhibit convenient handling characteristics by reason of their free-rolling shape.

As briefly discussed earlier, spherical pellets of confectionery material have long been used as a means for decorating and flavoring candies, baked goods and other edible items. Moreover, spherules find use as decorating and filling material in products other than foods. Spherules are especially suitable as having a shape for materials requiring a low surface-area-to-volume ratio in some particular uses.

An object of this invention is to provide a process for manufacturing solid spherules, en masse, in a liquid spherule processing vehicle.

A further object of this invention is to provide such spherules which, when placed in an aqueous leaching environment, exhibit prolonged release of the spherified materials.

A further object of this invention is to provide a process for manufacturing spherules wherein each spherule comprises a solid, substantially spherical, core material surrounded by a seamless film of polymeric material.

A further object of this invention is to provide a method for producing spherules, en masse, in a spherule processing vehicle in the form of substantially spherical, solid-core capsules.

In accordance with the above and other objects, a method has now been discovered for manufacturing solid spherules quickly, easily, and in only a few process steps. In practicing this invention, preliminary capsules are used, which contain a liquid solution or slurry of solid material. The liquid contained by the preliminary capsules, whether it is a solution or a slurry or dispersion of solid material, is made such that, on removal of only the liquid component, a residue of solid material is left behind to form the spherule. The capsules can be manufactured by known encapsulating processes and are named hereinbefore and hereinafter, "preliminary capsules." The preliminary capsules are immersed in a spherule processing vehicle of an organic liquid having slight miscibility with water and, using the organic liquid as a water-transporting agent, water is removed from the encapsulated liquid core of dissolved or slurried solid material to yield solid-core spherules.

An important aspect of the process of this invention resides in the discovery that dry, solid, spherules can be manufactured even from water-soluble or water-dispersible solid materials which normally would not be expected to exhibit a tendency to form cohesive, spherical, particles in the dry state. For example, droplets of an aqueous solution of crystalline material which would be expected to disintegrate into finer particles or droplets when dispersed, unprotected, into a liquid spherule processing vehicle, can now be formed into spherules by first being encapsulated in a hydrophobic polymeric capsule wall and then being subjected to desiccating forces. It has been discovered that water within the confines of a preliminary capsule wall can be transported across the polymeric capsule wall material without rupturing or otherwise degrading the capsule wall. Moreover, it has been discovered that the solid-containing particles which result from removing water from the interior of preliminary capsules are substantially spherical (hence, "spherules") and have substantially smooth and unwrinkled coverings or capsule walls of the polymeric material. It should be noted that the minimum ratio of surface area to volume exhibited by spherical entities, permits of a most efficient use of the polymeric material which coats the spherules. The low area-to-volume ratio permits use of less covering material per unit volume of solid, contained, material and, at the same time, the covering material provides a more uniform covering on the spherules than would be expected on particles having other shapes, e.g., granules, which particles may have sharp corners or edges.

Preliminary capsules for use in practicing this invention have capsule walls of hydrophobic polymeric material. While the encapsulating method used for producing the preliminary capsules is not important to practicing this invention, the method should be one which yields substantially spherical capsules when applied to encapsulating liquid capsule cores. Among many well-known encapsulating processes, can be included those processes which involve: liquid-liquid phase separation, impingement of droplets onto polymeric film solutions, interfacial polymerization, or solvent exaporation of droplets-coating polymeric film solutions. Examples of hydrophobic polymeric materials which can be utilized as preliminary-capsule wall materials in this invention include any of the hydrophobic polymeric materials commonly used to produce capsules. A few of such hydrophobic polymeric materials include: natural, halogenated, and synthetic rubbers; cellulose derivatives such as ethyl cellulose, cellulose nitrate, benzyl cellulose, cellulose acetate and cellulose acetate butyrate; styrene-type polymers such as polystyrene and polystyrene-maleic acid; poly(alkylenes) such as polyethylene, polypropylene, and polybutylene; poly-vinyl derivatives such as poly(vinyl acetate), poly(vinyl chloride), and poly(vinyl alcohol); and poly-acrylic derivatives such as poly(acrylic acid), poly(acrylonitrile), poly(methacrylate), and poly(butylacrylate).

Materials eligible to be contained in the spherules of this invention can be any water soluble or finely divided water-dispersible solids which will not interfere with the encapsulation process itself and which are substantially insoluble in the spherule processing vehicle. Of course, if desired or required for spherules of a particular use, more than one solid material can be contained in the spherules. Many times, for instance, an active material to be contained is encapsulated into preliminary capsules after first being dispersed or dissolved in a concentrated aqueous solution or slurry of a solid "filler" material. Combination with such a filler material may result in an alteration of the measure of protection provided for the active material by its being made more or less available to leaching action of aqueous environments—or the filler may merely serve to reduce the concentration of active material in the spherule. Fillers can be any normally solid materials, preferably materials having high water solubility, such as salts or hydrophilic organic materials, either polymeric or not. Examples of frequently used filler materials include sucrose, gum arabic, and water-soluble starch. Materials which customarily serve as fillers can, of course, be spherified without other materials being combined therewith—such as, for example, in a case wherein spherules containing only sucrose are desired. As has been mentioned, the spherules of this invention find utility in a multitude of applications, one of the more important being to contain pharmaceutical compositions which include a medicament as an active material. In manufacturing spherules which contain pharmaceutical compositions, an edible filler material is usually combined with the medicament. The filler material can be completely water soluble at all pH levels or it can be selected to exhibit water solubility which changes with change in pH of an aqueous medium. Filler materials can also be used which are sensitive to enzymes, bacteria, various chemical compounds or other materials which may effect the solubility of the filler material—all to the intended aim of altering release of active material from a spherule. Such filler materials which change solubility for example, with change in pH, find particular utility in preparation of spherules which are physiologically active and release their contents at a rate in accordance with the condition or kind of aqueous medium with which they are contacted.

Examples of a few pharmaceutical compounds which are eligible to be spherified by the process of this invention include: N-acetyl-p-aminophenol, amobarbitol, atropine sulfate, d-amphetamine sulfate, amphetamine phosphate, d-desoxyephedrine hydrochloride, desoxyephedrine sulfate, digitoxin, and potassium iodide.

The present process, in its preferred form, includes the following steps:

(a) Immersing preliminary capsules containing an aqueous solution or dispersion of solid material into an organic liquid spherule processing vehicle;

(b) Altering the processing vehicle or conditions in the processing vehicle causing desiccation of the preliminary capsules to yield spherules; and optionally, (c) Removing the spherules from the processing vehicle to yield a product of solid, dry, substantially spherical, solid-core capsules.

The step of immersing preliminary capsules in the spherule processing vehicle is usually, although not necessarily accompanied by continual agitation of the vehicle. Such agitation is helpful in continuously subjecting the entire exterior surface of the preliminary capsules to fresh portions of the processing vehicle, thereby increasing the efficiency of aqueous liquid transfer across the capsule interfaces.

The step of altering the processing vehicle or altering conditions in the processing vehicle includes methods for transferring aqueous liquid, contained within the preliminary capsules, across the capsule interface in order to desiccate the capsule contents and produce spherules. A preferred method for desiccating the capsule contents includes introducing particles of a solid desiccating material, insoluble in the spherule processing vehicle, to the mixture of preliminary capsules and spherule processing vehicle, as will be described hereinbelow.

The step of removing the spherules from the processing vehicle is accomplished by well-known techniques of straining or filtering or the equivalent and; in most cases, then evaporating the residual processing vehicle which may be present on the surface of the spherules. In the case of a reltaively non-volatile processing vehicle, it may be desired or required to rinse the processing vehicle from the spherules using a relatively volatile liquid which is a non-solvent for the spherule components. The relatively volatile liquid can then, in turn, be removed from the spherule surfaces by evaporation. Although the spherules are usually removed from the processing vehicle, the step of removing them from the processing vehicle is stated above to be optional because, strictly considered, the novel process for manufacturing the spherules is accomplished prior to removal of the spherules from the processing vehicle.

The sperule processing vehicle for use in this invention can be any organic liquid which demonstrates slight miscibility with water and which does not otherwise interfere with contents or components of the spherules such as by dissolving them or reacting with them at the conditions of spherule manufacture. In practice of this invention, the spherule processing vehicle serves as a transport medium to carry water away from, and thereby desiccate, the preliminary capsules immersed therein.

Organic liquids capable of dissolving as little as 0.01 percent, by weight, of water are eligible as spherule processing vehicles. Organic liquids which can dissolve from about 0.01 to about 0.30 percent, by weight, of water at spherule manufacturing conditions are preferred for use as spherule processing vehicles. It can be easily understood that the spherule processing vehicle, having entities of, liquid-containing, embryonic spherules immersed therein, has a tendency to dissolve water away from the entities until the concentration of water in the spherule processing vehicle approaches saturation. In the process of this invention, water is continuously removed from the spherule processing vehicle, thereby maintaining a continuous tendency or driving force which urges additional water to dissolve in the processing vehicle. The additional water is supplied by the immersed embryonic spherules which, after a time, due to removal of the water, become solid and substantially dry.

Examples of spherule processing vehicles which are eligible for use in practicing the present invention include, among many others: aromatic solvents, halogenated or not, such as, benzene, toluene, or xylene; aliphatic solvents, halogenated or not, such as cyclohexane, hexane, or heptane; and other solvents such as ethyl acetate, ethylmethylketone, and dioxane. In an instance wherein preliminary capsules are to be desiccated to yield spherules, it has often been found that the capsule manufacturing vehicle can also serve as the spherule processing vehicle. In the desiccating method wherein solid particles of a desiccant material are used, water is dissolved from the preliminary capsule contents, into the vehicle in a low concentration and is then sorbed by the desiccant material. The partially dried processing vehicle can then dissolve additional water from the preliminary capsules, present the dissolved water for sorption by the desiccant, and so on, continuously, until the spherules are substantially dry of water. Examples of desiccant materials which are eligible for use in the process of this invention include: silica gel and molecular sieves as preferred materials and other desiccating materials such as charcoal, asbestos and other well-known drying agents selected to be insoluble in the spherule processing vehicle.

The spherules of this invention can be manufactured to have diameters of from about 50 to about 2000 microns or perhaps slightly larger. The preferable and most often desired spherule size, to this time, has been from about 600 to about 7000 microns. Of course, it should be understood that spherule size is dependent on the method utilized for encapsulating the liquid capsule contents and is not a limitation of the present invention which present invention resides in a method for producing spherules from liquid-containing preliminary capsules. The present invention can be practiced on aqueous-liquid-containing preliminary capsules of virtually any size.

Spherules manufactured by the process of this invention can, of course, be treated in a multitude of ways to modify the properties of the spherules. For example, release properties of the spherules, that is, the rate at which material is leached from the spherule in certain environments, can be altered by several, well-known, methods such as by impregnating the polymeric spherule-covering film with wax or by chemically crosslinking the polymeric spherule-covering film to insolubilize it. Of course, the spherules of this invention can be further coated with any of several well-known coating materials such as with waxes or enterically active polymeric materials in order to modify the spherules with regard to physical appearance, or solubility characteristics. Coating methods such as pan-coating or fluidized-bed coating can be utilized to add coloring, flavoring or protective layers to the spherule exteriors for any of a multitude of different purposes, such as, for example, to increase palatability for human consumption or to provide a rodenticide-bait having increased attraction for rodent pests.

Having disclosed the invention and its broad scope in a general way, specific examples of preferred embodiments of the invention will now be described. It should be understood that the following examples set out preferred modes for practicing the invention and are not intended to limit the scope of the hereinabove-disclosed invention in any way.

DESCRIPTION OF PREFERRED EMBODIMENTS

Example 1.—In this example, spherules were produced from preliminary capsules having walls which included ethyl cellulose polymeric material. The spherule centers or preliminary capsule cores included a mixture of sucrose, gum arabic and a pharmaceutical material. The pharmaceutical material of this example was amobarbitol. In order to provide a complete disclosure for practicing the present invention, an encapsulating method for manufacturing the preliminary capsules will also be described in this example although it forms no part of the present invention.

Into a vessel having a capacity of about 3000 milliliters and equipped for agitation and heating, were placed the components of a capsule manufacturing system which included: 2000 grams of cyclohexane; 40 grams of a low molecular weight polyethylene material (such as the material designated as "Epolene C–10" and sold by Tennessee Eastman Company, Kingsport, Tenn., United States of America, and having an approximate molecular weight of about 7000 and a ring and ball softening point temperature of 100 to 101 degrees centigrade when tested according to the American Society for Testing Materials Specification D–36–62); 40 grams of ethyl cellulose polymeric material such as the material having an ethoxyl content of 48.0 to 49.5 percent, by weight, and a solution viscosity of about 90 to 105 centipoises as determined in a 5 percent, by weight, solution of the material in an 80/20 toluene/ethanol solvent according to the Ostwald method with Cannon-Fenske equipment as disclosed in the United States National Formulary, Edition 11, 1960, pp. 135–136; and 40 grams of an acetylated monoglyceride (such as the material designated as "Myvacet 700" and sold by Eastman Chemical Products, Inc., New York, N.Y., United States of America). Among the above-listed materials, the ethyl cellulose is the major capsule-wall-forming material, the polyethylene is a liquid-liquid phase-separation-inducing material, and the acetylated monoglyceride material, was introduced to provide a liquid separated phase at a desired temperature of about 70 degrees centigrade. The cyclohexane was, of course, the liquid capsule manufacturing vehicle. The above mixture was heated to about 70 degrees centigrade and placed in a condition of agitation.

Into a vessel having a capacity of about 600 milliliters and equipped for heating and agitation, were placed the following components of the intended preliminary capsule internal phase: 270 grams of sucrose, 27 grams of gum arabic, and 81 grams of water. This mixture was heated, with agitation, to the boiling point until a solution of the materials resulted. The aqueous solution was then cooled to about 70 degrees centigrade and 148 grams of powdered amobarbitol having a particle size of less than about 150 microns was dispersed therein. The liquid preliminary capsule internal phase system, now containing amobarbitol, was dispersed into the capsule manufacturing system as droplets, having diameters of about 200 to 1000 microns, and then the entire system was cooled to about 25 degrees centigrade over a duration of about 30 to 45 minutes. The cooled system was found to contain substantially spherical preliminary capsules consisting of droplets of the aqueous system encased in capsule walls of ethyl cellulose polymeric material.

In order to desiccate the encapsulated droplets, 220 grams of anhydrous silica gel having a particle size of less than about 420 microns were added to the agitating, preliminary-capsule-containing, system. The silica gel altered conditions in the cyclohexane vehicle by adsorbing water therefrom, thus providing a driving-force for removal of water from the preliminary capsules by transfer of the water through the capsule walls. After a duration of about four hours, the preliminary capsules were substantially completely desiccated to form spherules. The spherules and silica gel particles were separated from the vehicle by filtering, were washed with two changes of cyclohexane and were dried by evaporating the residual cyclohexane. The spherules were easily separated from the particles of silica gel by sieving the mixture.

Example 2.—This example was identical with Example 1 with the exception that the spherules were soaked in a 20 percent, by weight, solution of paraffin in cyclohexane prior to evaporating the residual cyclohexane. Such a wax-soak provided additional protection for the spherule-contained solid material by impregnating the polymeric spherule-covering film with waxy hydrophobic material.

Example 3.—The encapsulating procedure for this example was substantially identical with that of Example 1 except that smaller amounts of materials were used. The spherules of this example were made to contain N-acetyl-p-aminophenol, a common analgesic and antipyretic pharmaceutical material. The preliminary capsule manufacturing system included: 750 grams cyclohexane; 15 grams polyethylene (as before specified); 15 grams ethyl cellulose (as before specified); and 15 grams acetylated monoglyceride (as before specified). The intended preliminary capsule internal phase included: 100 grams sucrose; 20 grams water; and 40 grams N-acetyl-p-aminophenol (powdered to a particle size of less than about 149 microns). The preliminary capsules were used to manufacture spherules by desiccating the capsules in the same manner as was described in Example 1. The silica-gel-dried spherules were identical in physical appearance with spherules of the preceding examples.

All of the preceding examples taught manufacture of spherules containing a pharmaceutical material. The pharmaceutical material can be replaced, weight for weight, by additional sucrose or gum arabic or other filler material or by other materials, insoluble in the processing vehicle, which are desired or required to be spherified.

Example 4.—The preliminary capsule manufacturing system of this example was identical with Example 1 as to kinds and amounts of encapsulating materials and encapsulating procedure. The material contained within the preliminary capsules, however, was a solution of 200 grams of water-soluble starch (such as the material designated as "Stayco A" sold by A. E. Staley Manufacturing Company, Decatur, Ill., United States of America), in 100 grams of water.

The preliminary capsules were dispersed in a cyclohexane vehicle with about 400 grams of anhydrous silica gel particles to desiccate the capsules and yield spherules. After the desiccating step, the starch-containing spherules of this example were not completely dried. The spherules were, therefore, separated from the processing vehicle and the desiccant material, as in previous examples, and the spherules were merely placed in the path of circulating dry air for a time to completely dry the spherules. It should be noted that the initial desiccating step of this example was necessary to produce spherical entities, although a final step of evaporating water could be used to complete the spherules. Preliminary capsules dried by evaporation of the contained water without benefit of a prior desiccating step were found to be non-spherical and to have polymeric covering films which are severely wrinkled.

The amount of desiccant material to be used in production of spherules according to this invention can be easily determined experimentally. An overabundance of desiccant does no harm and, should too little be used, an additional amount can easily be introduced during the desiccating process. In the use of silica gel in practice of this invention, an amount of anhydrous silica gel one to two times, by weight, the amount of water to be desiccated is usually sufficient.

What is claimed is:
1. A process for producing, en masse, spherules of solid material from preliminary capsules having walls of hydrophobic polymeric material and containing an aqueous liquid which, when desiccated, leaves a residue of solid material, comprising the steps of:
 (a) immersing the preliminary capsules in a spherule processing vehicle slightly miscible with the aqueous liquid of the preliminary capsules and substantially immiscible with the solid material;
 (b) desiccating the capsules to form spherules of the residue of solid material by adding, to the spherule processing vehicle, an amount of solid desiccating material, insoluble in the vehicle, sufficient to sorb substantially all of the liquid from the immersed preliminary capsules; and optionally
 (c) separating the spherules from the spherule processing vehicle.

2. The process of claim 1 wherein the liquid contained within the preliminary capsules, prior to the capsules being desiccated, is in a solution with the solid material.

3. The process of claim 1 wherein the solid material is present in the liquid contained within the preliminary capsules as a finely-divided dispersion.

4. In a process for producing spherules of solid material comprising the steps of: immersing, in a spherule processing vehicle, droplets of an aqueous liquid composition having at least one solid material component dissolved or dispersed therein and removing the aqueous liquid from the immersed droplets to leave a residue of solid material in substantially spherical shape, the improvement which comprises; containing the liquid droplets within preliminary capsule walls of hydrophobic polymeric material and removing the liquid from the immersed preliminary capsules by adding, to the spherule processing vehicle, an amount of solid desiccating material, insoluble in the vehicle, sufficient to sorb substantially all of the liquid from the immersed preliminary capsules thereby causing transfer of the liquid away from the droplets, through the capsule walls, and into the spherule processing vehicle, which vehicle is slightly miscible with the aqueous liquid of the preliminary capsules and is substantially immiscible with the solid material, whereby spherules are manufactured from the residue of solid material.

5. A process for producing spherules of solid material, en masse, using preliminary capsules containing an aqueous liquid composition including at least one solid material component, in a spherule processing vehicle slightly miscible with the aqueous liquid of the preliminary capsules and substantially immiscible with the solid material comprising the steps of:
   (a) establishing an agitating system comprising a continuous phase of spherule processing vehicle and a discontinuous, dispersed phase of preliminary capsules, the capsules having capsule walls of hydrophobic polymeric material and containing a liquid composition which, when dried, leaves a residue of solid material; and
   (b) continuously desiccating the liquid of the preliminary capsules by adding, to the spherule processing vehicle, an amount of solid desiccating material, insoluble in the vehicle, sufficient to sorb substantially all of the liquid from the immersed preliminary capsules and maintaining the agitating system until substantially all of the liquid of the capsules has been transferred through the walls of the dispersed capsules into the spherule processing vehicle to yield solid spherules.

6. A process for producing, en masse, spherules of solid material from preliminary capsules having capsule walls of hydrophobic polymeric material and containing an aqueous liquid which, when removed from the capsules, leaves a substantially spherical residue of the solid material, comprising the steps of:
   (a) immersing the liquid-containing preliminary capsules in a liquid spherule processing vehicle slightly miscible with the aqueous liquid of the preliminary capsules and substantially immiscible with the solid material:
   (b) immersing in the spherule processing vehicle, a solid desiccant, substantially insoluble in the vehicle;
   (c) maintaining immersion of the preliminary capsules and the solid desiccant for a time sufficient to permit substantially all of the liquid contained within the preliminary capsules to be diffused through the capsule walls, dissolved in the spherule processing vehicle, and sorbed from the spherule processing vehicle by the solid desiccant to produce spherules with solid contents; and, optionally,
   (d) separating the spherules with solid contents from the spherule processing vehicle.

References Cited
UNITED STATES PATENTS

| | | | |
|---|---|---|---|
| 2,756,177 | 7/1956 | Cannalonga et al. | 117—100X |
| 3,137,630 | 6/1964 | Hecker et al. | 264—14 |
| 3,173,878 | 3/1965 | Reyes | 252—316 |

RICHARD D. LOVERING, Primary Examiner

U.S. Cl. X.R.

99—166; 117—100; 424—33, 35, 254, 324